United States Patent [19]

Rasshofer et al.

[11] 4,436,841

[45] Mar. 13, 1984

[54] SINGLE-PHASE, STORAGE-STABLE POLYOL COMPOSITIONS CONTAINING SALTS AND THE USE THEREOF IN THE PRODUCTION OF POLYURETHANES

[75] Inventors: Werner Rasshofer, Cologne; Wolfgang Reichmann, Hilden; Adolf Richartz, Cologne; Manfred Dietrich, Leverkusen, all of Fed. Rep. of Germany

[73] Assignee: Bayer Aktiengesellschaft, Leverkusen, Fed. Rep. of Germany

[21] Appl. No.: 497,640

[22] Filed: May 24, 1983

[30] Foreign Application Priority Data

May 26, 1982 [DE] Fed. Rep. of Germany ....... 3219822

[51] Int. Cl.$^3$ .................. C09K 3/00; C08G 18/14; C08G 18/65
[52] U.S. Cl. ................. 521/106; 252/182; 521/120; 521/123; 521/125; 521/128; 521/99; 521/914; 264/45.3; 264/50; 264/53
[58] Field of Search ............... 521/106, 125, 123, 128, 521/120, 99, 914; 252/182

[56] References Cited

U.S. PATENT DOCUMENTS

| | | | |
|---|---|---|---|
| 3,087,900 | 4/1963 | Brown | 260/2.5 |
| 3,087,901 | 4/1963 | Brown | 260/2.5 |
| 3,298,980 | 1/1967 | Lindberg et al. | 260/18 |
| 3,424,691 | 1/1969 | Newton | 252/188.3 |
| 3,441,523 | 4/1969 | Dwyer et al. | 260/2.5 |
| 3,873,476 | 3/1975 | Jabs et al. | 521/914 |
| 3,945,939 | 3/1976 | Barron | 252/182 |
| 4,029,493 | 6/1977 | Theissen | 71/105 |
| 4,040,992 | 8/1977 | Bechara et al. | 521/902 |
| 4,125,505 | 11/1978 | Critchfield et al. | 260/33.2 R |
| 4,141,852 | 2/1979 | Hogan et al. | 252/182 |
| 4,176,218 | 11/1979 | Demon et al. | 521/914 |
| 4,226,756 | 10/1980 | Critchfield et al. | 260/33.2 R |
| 4,273,884 | 6/1981 | Dominguez | 521/114 |
| 4,282,329 | 8/1981 | von Bonin et al. | 521/99 |

FOREIGN PATENT DOCUMENTS

| | | |
|---|---|---|
| 1770703 | 11/1971 | Fed. Rep. of Germany . |
| 2309861 | 8/1974 | Fed. Rep. of Germany . |
| 2759398 | 7/1980 | Fed. Rep. of Germany . |
| 2162587 | 7/1973 | France . |
| 1355227 | 6/1974 | United Kingdom . |

*Primary Examiner*—H. S. Cockeram
*Attorney, Agent, or Firm*—Gene Harsh; Joseph C. Gil

[57] ABSTRACT

A single-phase, storage-stable, emulsifier-free polyol mixture comprising 100 parts of a relatively high molecular weight polyoxyalkylene polyol of OH number from 20 to 120, which has at least 5% and less than 80% by weight, of terminal oxyethylene blocks; from 1 to 100 parts of a low molecular weight diol mixture which is a reaction product of ethylene glycol, butane diol-1,4, or a mixture of ethylene glycol and butane diol-1,4, with from 0.05 to 0.50 mols of alkyl oxiranes; from 0.1 to 5 parts of solubilizing additives comprising one or more salts, the cations of which are from Groups I, II and III of the Periodic Table, ammonium or mono- to tetraalkyl ammonium ions, and the anions of which are produced by removing at least one proton from an acid having a $K_s$ value of at least $10^{-7}$; and, optionally, other compounds having isocyanate-reactive hydrogen atoms and other auxiliaries and additives for polyurethane production. Also polyurethanes produced using these polyol mixtures.

15 Claims, No Drawings

SINGLE-PHASE, STORAGE-STABLE POLYOL COMPOSITIONS CONTAINING SALTS AND THE USE THEREOF IN THE PRODUCTION OF POLYURETHANES

This invention relates to new homogeneous, storage-stable polyol mixtures containing salts and having a high "mixed OH number" (a high OH-number of the mixture) and a high ethylene glycol and/or butane diol-1,4 content produced from relatively high molecular weight polyoxyalkylene polyols of OH number from 20 to 210 which have at least 5%, by weight, of predominantly or exclusively terminal oxyethylene oxide blocks, and reaction products of ethylene glycol and/or butane diol-1,4 with from 0.05 to 0.5 mols of alkyl oxiranes. The present invention also relates to the use of these polyol mixtures in the production of polyurethanes.

BACKGROUND OF THE INVENTION

It is known from German Auslegeschrift No. 1,770,703 to use mixtures of mutually-incompatible polyols in the production of polyurethanes, and from German Offenlegungsschrift No. 2,309,861, to use these incompatible polyol mixtures to produce foam moldings having compact surfaces. In the manner according to these references, end products having improved properties, such as, for example, improved heat resistance or improved impact strength, may be obtained.

The use of these incompatible polyol mixtures is, however, attended by a number of disadvantages in storage and processing. Even short-term storage, i.e., from a few hours up to three days, of such normally-incompatible polyols causes the mixtures to separate into two phases. Thus, before each use, the polyol mixtures must be intensively mixed again or they must be constantly mixed or circulated, in order to ensure that the mixture ratio of the components is maintained.

Various methods are known to adjust such mixtures so that a stable phase will result. According to U.S. Pat. No. 3,945,393, the phases may be precipitated by adding colloidal silica or a clay which is modified with an onium compound. Similarly, German Offenlegungsschrift No. 2,341,294 teaches the simultaneous use of inert, surface-active materials which have specific surface areas of from 10 to 800 m²/g, such as agglomerated silica and/or a chrysotile asbestos, or an inorganic material corresponding to chrysotile asbestos in its mineral structure.

Another possibility of homogenizing several mutually-incompatible polyols resides in the simultaneous use of liquid or solutions of solid solubilizers. Thus, according to U.S. Pat. No. 4,141,852, mixtures of monomeric polyols having molecular weights of greater than 500 and polyether polyols having molecular weights of from 1800 to 7000 remain mixed with the simultaneous use of so-called "graft polypropylene ether glycols" having molecular weights of from 1500 to 3500. A stable emulsion of a high molecular weight polyol and ethylene glycol or butane diol-1,4 is prepared, according to U.S. Pat. No. 4,273,884, by simultaneously using an ethylene oxide/propylene oxide copolymer (molecular weight $\geq 12000$). German Auslegeschrift No. 2,759,398, describes stable mixtures of poly(oxypropylene/oxyethylene)polyols (OH numbers of from 20 to 60), having certain oxyethylene contents, and ethylene glycol or butane diol. In United States Published Patent Application No. B471,405, mixtures of high molecular weight polyoxyalkylene polyols which have OH equivalent weights of from 650 to 3000, and, for example, ethylene glycol, are protected against separation by the simultaneous use of compounds, such as, 1,2-butylene glycol, di-(1,2-butylene glycol), di-(1,2-propylene glycol) and tri-(1,2-propylene glycol). Further, those skilled in the art know that two-phase mixtures of mutually-incompatible polyols may also be adjusted to be single phase by adding a small quantity of emulsifiers, such as long-chain benzene alkyl sulphonates.

None of these prior art teachings is completely satisfactory, however. The use of solids as emulsion stabilizers may cause the abrasion of mixing apparatus and the stabilizing effect itself generally subsides quite considerably after a few days. Physiological reservations have recently been advanced against asbestos materials. Additionally, the inherent catalytic activity of silica or chrysotile surface active materials, in particular, when modified with onium compounds, may also cause complications.

The simultaneous use of so-called "graft polyols", as proposed by U.S. Pat. No. 4,141,852, adds the expense of such "graft polyols", and thus reduces the economy of the process. Even when these "graft polyols" are used, the effort to create a single phase, storage-stable polyol mixture is not necessarily satisfied, as the emulsions produced according to U.S. Pat. No. 4,273,884 exhibited at least partial separation of the phases within the first 6 to 8 weeks and the reference itself states that its emulsions are only "fairly stable" anyway. Further, while the simultaneous use of di- and tri-propylene glycol, as disclosed in United States Published Patent Application No. B471,405, allows the production of single-phase, stable polyol mixtures, it is well known that the simultaneous use of these compounds results in a sharp decrease in the mechanical properties of polyurethane parts produced therefrom, with heat stability of the end product particularly suffering.

The use of conventional emulsifiers for maintaining stable mixtures is also attended by a number of disadvantages. In time, the emulsifiers may precipitate from the polyol mixture in a crystalline form, or they may become concentrated, for example, on the surface of the liquid. Also, these emulsifiers may change the catalytic system balance in an uncontrollable manner, or they may migrate from the finished polyurethane molding and thus drastically reduce the use properties thereof.

These problems are particularly troublesome in that there is an urgent commercial interest in polyol formulations which have a high mixed OH number and a high proportion of ethylene glycol and/or butanediol-1,4, which are completely stable in storage for a sufficiently long period of time (for a minimum of about 6 months), are optically clear, and do not contain other solid or liquid additives. Particularly, any additives which are present must not precipitate or separate in another manner, or enter into or change a reaction.

Surprisingly, it has been found that mixtures of certain polyoxyalkylene polyols and certain hydroxy compound/alkoxirane reaction products are single-phase and storage-stable within particularly wide areas. These mixtures are completely clear optically and have a high proportion of ethylene glycol or butane diol-1,4, without too high a content of undesirable alkoxylation products of ethylene glycol or butane diol-1,4, when they contain ammonium and/or metal salts of, for example, $C_1$-$C_8$ mono- or poly-carboxylic acids.

DESCRIPTION OF THE INVENTION

The present invention is directed to a single-phase, storage-stable, emulsifier-free polyol mixture having a high mixed OH number and a high content of free polyols which have OH numbers of from 1000 to 1720, preferably having a high content of free ethylene glycol and/or butane diol-1,4, which is produced from (a) a relatively high molecular weight polyoxyalkylene polyol;
(b) a mixture of low molecular weight diols;
(c) solubilizing additives; and, optionally,
(d) other known compounds having isocyanate-reactive hydrogen atoms; and
(e) known auxiliaries and additives for polyurethane production wherein the mixture is characterized in that a polyoxyalkylene polyol of OH number from 20 to 210, which has at least 5%, and less than 80%, preferably from 10 to 50%, and more preferably, from 12.5 to 27.5%, by weight, of predominantly or exclusively terminal oxyethylene blocks, is used as component (a) and a low molecular weight diol mixture having an OH number of from 1000 to 1720, the diols of which are reaction products of:

(1) compounds having at least two hydroxyl groups and OH numbers of from 1244 to 1828, preferably ethylene glycol and/or butane diol-1,4, and more preferably ethylene glycol; and
(2) from 0.05 to 0.50 mols, preferably from 0.1 to 0.5 mols, and more preferably, from 0.2 to 0.4 mols, of alkyl oxiranes corresponding to the general formula:

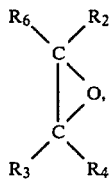

wherein
$R_1$ represents $CH_3$, $CH_2Cl$ or $C_2H_5$;
$R_2$ represents H or $CH_3$; and $R_3$ and $R_4$ represent H, $CH_3$ or $C_2H_5$;
preferably propylene oxide, is used as component (b), and wherein the solubilizing additives (c) include one or more salts, the cations of which are from Group I, II or III of the Periodic Table, ammonium or mono- to tetraalkyl ammonium ions, and the anions of which are obtained by removing at least one proton from an acid having a $K_s$ value of at least $10^{-7}$, preferably anions of mono- or poly-carboxylic acids, of carbonic acid, of halogen, pseudo-halogen, or of chalcogen acids.

Di- or higher-functional compounds having isocyanate-reactive hydrogen atoms and a molecular weight of from 32 to 399 may be used as optional component (d).

The preferred polyol mixture comprises 100 parts of component (a), from 1 to 100, preferably from 5 to 50, more preferably from 10 to 40, parts of component (b), from 0.01 to 5, preferably from 0.1 to 2.5, parts of component (c) and optionally from 0 to 20 parts of component (d).

Polyol mixtures are preferred in which the component (b) consists of:

(i) at least 40%, and preferably from 40 to 80%, by weight, of non-alkoxylated compounds containing at least two hydroxyl groups and having OH numbers of from 1244 to 1826, preferably at least 54%, by weight, of ethylene glycol or butane diol-1,4;
(ii) from 20 to 50%, preferably from 20 to 40%, by weight, of monoalkoxylation (preferably monopropoxylated) products of the above at least di-hydroxyl-functional compounds;
(iii) from 0 to 20%, preferably from 0 to 5%, by weight, of dialkoxylation (preferably di-propoxylated) products of the above at least di-hydroxyl-functional compounds;
(iv) from 0 to 10%, preferably from 0 to 1%, by weight, of trialkoxylation (preferably tri-propoxylated) products of the above at least di-hydroxyl-functional compounds; and
(v) from 0 to 2%, by weight, of even higher alkoxylated products of the above at least di-hydroxyl-functional compounds.

Furthermore, preferred polyol mixtures contain, as component (a), polyoxyalkylene polyols having oxyethylene blocks that are predominantly or exclusively terminal in quantities of from 10 to 15%, more preferably of from 12.5 to 27.5%, by weight. The polyoxyalkylene polyols are in particular di- to tetra-hydric polyols of the type having an OH number of from 20 to 60.

The present invention also relates to the use of these single-phase, storage-stable, emulsifier-free polyol mixtures containing salts as a reaction component in the production of polyurethanes.

The single-phase, storage-stable, emulsifier-free polyol mixtures according to the instant invention have several significant advantages over mixtures according to the prior art. A qualitative improvement is observed during the production of polyurethane integral skin foams using these polyol mixtures. The non-cellular skin is thicker and free from "pin holes" and other surface defects, including "deflations", i.e., irregular craters. Also, while one or more "cell-stabilizers", such as those based on polysiloxane-polyalkylene oxide copolymers, are normally used in the production of polyurethane integral skin foams, in particular, for rigid foams, in many cases it is possible to partly or completely dispense with the use of such stabilizers when using the polyol mixtures according to the present invention. Using mixtures according to the instant invention and a suitable method, so-called "heat-moldable" polyurethane integral-skin foams, which have an improved dimensional stability to heat, may also be produced. In many cases, an inherent catalytic activity, which often suffices for normal uses, is imparted to the polyol mixtures by adding the carboxylic acid salts.

Surprisingly, it has been found that only very specific polyether polyols together with mixtures of specific low molecular weight diols produce a single-phase polyol mixture with particularly high mixed OH number, and a relatively high ethylene glycol or butane diol-1,4 content, but a relatively low content of alkoxylation products of ethylene glycol or butane diol.

The polyether polyols to be used as component (a) are linear or branched, di-, tri-, tetra- or higher functional polyoxyalkylene polyols, ("polyalkylene oxide polyols"), which have an OH number of from 20 to 210, preferably from 20 to 120, more preferably from 20 to 60, and which have at least 5% and less than 80% by weight, of polyoxyethylene blocks predominantly or exclusively located at the ends of the chain. Those polyoxyalkylene polyols are particularly preferred wherein from 10 to 50%, by weight, of all the oxyalkylene units in the polyol are terminal oxyethylene blocks. The most favorable properties are achieved with polyoxyalkylene polyols which contain from about 12.5 to 27.5%, by weight, of terminal oxyethylene blocks. The polyoxyalkylene polyols are preferably di-, tri- or tetra-functional, with di- or tri-functional polyoxyalkylene polyols having the above-mentioned OH numbers being particularly preferred. The most important polyoxyalkylene polyols commercially are the polyoxypropylene polyols having from 10 to 50%, preferably from 12.5 to 27.5%, by weight, of terminal oxyethylene blocks which have functionalities of from 2 to 3.

These relatively high molecular weight polyalkylene oxide polyols are produced by conventional processes. Thus, these polyols are produced by the polymerization of alkylene oxides, such as ethylene oxide, propylene oxide, 1,2- or 2,3-butylene oxide, tetrahydrofuran, styrene oxide and/or epichlorohydrin, with starting components having reactive hydrogen atoms, such as water; ammonia; polyols, for example, ethylene glycol, propane diol-1,2 or -1,3, dipropylene glycol, trimethylolpropane, glycerine, pentaerythritol, sorbitol, sucrose, or 4,4'-dihydroxy-diphenyl-propane; amines, for example, aniline; polyamines, for example, ethylene diamine; or amino alcohols, for example, ethanolamine; optionally in the presence of acidic or, preferably, basic catalysts. Polymerization may be carried out in the presence of ethylene oxide, but preferably in a step-wise reaction with the addition of ethylene oxide in the final stage.

Polyoxypropylene polyether polyols having terminal oxyethylene sequences and primary hydroxyl groups are particularly preferred. In the polyethers, the oxyethylene sequences or blocks may also be partly internal, but they must be predominantly terminal.

The production and properties of such polyethers are described in Ullmanns Enzyklopaedie der Technischen Chemie, Verlag Chemie, Weinheim, 4th Edition, Volume 19, (1981) in the chapter entitled "Polyalkylene Glycols" (pages 31 to 38) and in the chapter entitled "Polyurethanes" (pages 301 to 341, in particular pages 304 to 308), and they are also dealt with in the Kunststoff-Handbuch, Volume VII, Polyurethane, Carl Hanser Verlag, Munich, 1966 (on pages 61-75).

The polyol components (b) are mixtures which are produced by the known reaction of polyols having at least two hydroxyl groups and OH numbers of from 1244 to 1828 with alkyl oxiranes. According to the present invention, from 0.05 to 0.50, preferably from 0.1 to 0.5, and more preferably from 0.2 to 0.4, mols of alkyl oxirane, preferably propylene oxide, are used per mol of ethylene glycol or butane diol-1,4. The alkoxylation of the hydroxyl compounds may be catalyzed by bases (for example, using alkali metal hydroxides) or by acids (for example, using BF$_3$-etherate), but is preferably catalyzed using KOH. At the end of the reaction, the catalyst is neutralized or absorbed, then optionally removed by known methods.

For the present purposes, preferred diols or triols are those which are not miscible or are insufficiently miscible for practical purposes in conventional polyethers, without modification with alkyl oxiranes according to the present invention.

Preferred diols or triols include ethylene glycol, 1,2-propane diol, 1,3-propane diol, 3-chloro-1,2-propane diol, 1,2-, 1,3- or 1,4-butane diol, 2-butene-1,3-diol, glycerin, trimethylolethane, 1,2,6-hexane triol, trimethylolpropane, pentaerythritol, butane triol-1,2,4 and mono- and oligo-ethoxylation products thereof. Ethylene glycol and butane diol-1,4 are particularly preferred.

Suitable alkyl oxiranes for use in preparing the low molecular weight diols suitable according to the instant invention include, for example, propylene oxide, chloromethyloxirane, ethyloxirane and 2,2-dimethyloxirane. Alkyl oxiranes which may be added by basic catalysis are preferred and propylene oxide is particularly preferred.

Suitable alkyl oxiranes are reacted with compounds having at least two hydroxyl groups and OH numbers of from 1244 to 1828, such that from 0.05 to 0.50, preferably, from 0.1 to 0.5, more preferably from 0.2 to 0.4, equivalents of oxirane groups are used per equivalent of OH groups orginating from the cross-linker. Propylene oxide is preferably reacted with the diols, especially ethylene glycol or butane diol-1,4, but diol mixtures may also be reacted with alkyl oxiranes in the abovedescribed hydroxyl/oxirane group ratio.

The production of these diols is carried out by known means in an autoclave which is equipped with a heating and cooling device, a stirring apparatus, a means for expelling the air (for example, a vacuum connection and nitrogen supply line), optionally an apparatus for azeotropic dehydration, and a means for metering in the alkylene oxides. Further details are provided, for example, in Polymer Syntheses (S. R. Sandler, W. Karo), Academic Press, New York, 1980, page 139 et seq.

Salts, the cations of which are from Groups I, II or III of the Periodic Table, ammonium or mono- or tetra-alkyl ammonium ions and the anions of which are produced by removing at least one proton from an acid having a pK$_s$ value of at least $10^{-7}$, the acid being a mono- or poly-carboxylic acid, carbon dioxide, hydrohalic, pseudo-hydrohalic or chalcogen acid, are used as solubilizing component (c). Examples of such acids include mono- or poly-carboxylic acids having from 1 to 8 carbon atoms, for example, aliphatic mono- to tri-carboxylic acids, such as formic, acetic, propionic, butyric, n-octanoic, 2-ethylcaproic, glutaric, adipic, nitrilotriacetic, and N,N'-dimethyl-ethylene diamine diacetic acids. Semi-esters or semi-amides of these di- and tri-carboxylic acids or mono- or poly-carboxylic acids containing hydroxyl, mercapto or amine groups, such as glycine, alanine, or thiol glycolic, malic and tartaric acids and the salts of hydrochloric, hydrobromic, hydroiodic, thiocyanic, hydrocyanic, hydroisocyanic, sulphuric, nitric or phosphoric acids may also be used. Cations for component (c) which originate from Group I, such as Li$^\oplus$, Na$^\oplus$, and K$^\oplus$, particularly K$^\oplus$ and Na$^\oplus$, are preferred. The anions of aliphatic C$_1$-C$_8$ monocarboxylic acids or those of hydrohalic, pseudo-hydrohalic, sulphuric, nitric, and phosphoric acids are particularly preferred. Potassium acetate, and, in particular, potassium chloride, which is inert with respect to NCO reactions, are preferred salts for use as the solubilizing component.

Component (c) salts are used in a quantity such that from 0.01 to 5 parts, preferably from 0.1 to 2.5 parts, of the salts are used per 100 parts of component (a). In the case of salts which are only marginally-soluble, i.e., those in which less than 5 parts of salt are dissolved, based on component (a), the quantity corresponding to the solubility product of the relevant salt is the upper limit that may be used.

The process which is generally carried out involves dissolving component (c) in component (b), optionally with heating, and then combining this solution with component (a), and optionally with component (d). Since, according to the present invention, single-phase, stable, optically-clear polyol mixtures are provided, component (c) must also have a sufficiently great solubility in admixture with (a).

In the addition of the alkyl oxirane to the polyol having an OH number of from 1244 to 1828 is catalyzed using known bases (for example, using KOH), and is neutralized with an acid (for example, acetic acid) at the end of the adduct formation, the acid producing a salt which is soluble in component (b) (for example, potassium acetate). In this operation, the quantity of catalyst used during the alkoxylation reaction is optionally determined by the limits specified above on the quantities of salt.

That these salts are capable of acting, in a small concentration, as solubilizers between polyols and alkoxylated or partly alkoxylated diols and/or triols which have OH numbers of from 1000 to 1720, preferably ethylene glycol or butane diol-1,4, has not previously been known. Moreover, this solubilizing effect does not appear during the mixing of polyether polyols with free diols and/or triols of OH number from 1244 to 1826, specifically ethylene glycol or butane diol-1,4 but appears only during the mixing of higher molecular weight polyoxyalkylene polyols with reaction products (b), which are obtained from polyols having at least two hydroxyl groups and OH number from 1244 to 1826 with alkyl oxiranes, the mixing of polyols and alkyl oxiranes being carried out in an equivalent ratio of from 1:0.1 to 1:0.5, preferably of from 1:0.2 to 1:0.4.

Compounds having at least two, preferably two or three, isocyanate-reactive hydrogen atoms and having a molecular weight of from 32 to 399 are suitable as optional starting components (d). Compounds containing hydroxyl groups and/or amino groups and/or thiol groups and/or carboxyl groups, preferably compounds containing hydroxyl groups and/or aromatic amino groups, which are used as chain-lengthening agents or cross-linking agents are suitable according to the instant invention. They are only used in a quantity such that, the single-phase nature of the polyol mixture according to the present invention is maintained, with the compatibility being determined in simple preliminary tests. In this case as well, mixtures of different compounds having at least two isocyanate-reactive hydrogen atoms and a molecular weight of from 32 to 399 may be used.

Examples of such suitable compounds include ethane diol, propane diol-(1,2) and -(1,3), butane diol-(1,4), -(1,3) and -(2,3), pentane diol-(1,5), hexane diol-(1,6), octane diol-(1,8), neopentyl glycol, 1,4-bis-hydroxymethyl-cyclohexane, 2-methyl-1,3-propane diol and dibromobutene diol. Glycerin, trimethylolpropane, hexane triol-(1,2,6), trimethylolethane, pentaerythritol, quinitol, mannitol, sorbitol, castor oil, di-, tri-, and tetra- and higher polyethylene glycols, di-, tri-, tetra- and higher polypropylene glycols, and di-, tri- and higher polybutylene glycols which have molecular weights up to 399 may be used according to the invention. Also, 4,4'-dihydroxy-diphenyl-propane, dihydroxyethylhydroquinone, ethanolamine, diethanolamine, diisopropanolamine, N-methyl-diethanolamine, triethanolamine, 3-aminopropanol and dimethylol-propionic acid and mixtures of hydroxyaldehydes and hydroxyketones ("formose") and reduced derivatives thereof ("formitols") are suitable low molecular weight polyols. Di- and/or tri-hydric polyols, in particular the unbranched aliphatic diols having from 2 to 8 carbon atoms, such as butane diol-1,4 and/or hexane diol-1,6 are preferred.

Aromatic diamines of the type specified in German Offenlegungsschrift No. 2,854,384, for example, 4,4'-diamino-diphenylmethane, are generally used as polyamines. Relatively low-melting, relatively soluble aromatic nuclear-alkylated diamines, for example, nuclear-dialkylated toluylene-2,4- or -2,6-diamines, such as 3,5-diethyl-toluylene-2,4-diamine and/or 3,5-diethyltoluylene-2,6-diamine, 4-alkyl-3,5-diaminobenzoic acidisobutyl ester, and di-, and tri- or tetra-$C_1$-$C_4$-alkyldiphenylmethane-4,4'-diamines, optionally having different alkyl substituents on the different nuclei, are prefrred as these polyamines. Aliphatic diamines, for example, ethylene diamine and hexane-1,6-diamine, are less preferred, but they may be used more effectively in the form of the less reactive aldimine or ketimine derivatives thereof (see U.S. Pat. No. 3,734,894/German Offenlegungsschrift No. 2,637,115).

A thorough summary of other suitable chain-lengthening agents or cross-linking agents which may be used as optional component (d) is provided in German Offenlegungsschrift No. 2,854,384.

The known types of catalysts, for example, tertiary amines, such as dimethyl-benzylamine, 1,4-diazabicyclo-(2,2,2)-octane or triethanolamine, mono- or bicyclic amidines, bis-dialkylamino(alkyl)ethers or tertiary amines containing amide groups are included with other conventional auxiliaries and additives as optional component (e). Basic catayts may also be used, such as alkali metal hydroxides, alkali metal phenolates or alkali metal alcoholates, and organic metal compounds, in particular organic lead and tin compounds, for example, tin-(II)-octoate, tin-(II)-laurate, dibutyl tin dilaurate or mixtures thereof.

Reaction retarders for the isocyanate reaction, for example, acid-reacting substances, such as hydrochloric acid or organic acid halides, boric acid or sulphur dioxide; known cell regulators for foams, such as paraffins, fatty alcohols, or dimethyl-polysiloxanes; pigments and/or dyes; known flameproofing agents; stabilizers against the influences of light, ageing and weathering; plasticizers; and fungistatically- and bacteriostatically-acting substances may also be added. Other examples of these additives are contained in Kunststoff-Handbuch, Volume VII, published by Vieweg & Höchtlen, Carl Hanser Verlag, Munich, 1966, on pages 96–113, and in "Treibmittel zur Herstellung von Polyurethanschaumstoffen," on pages 453–455 and 507–510.

For the production of polyurethanes, the polyol mixture according to the present invention is used as the sole or part of the hydroxyl reaction component, together with polyisocyanates and optionally other auxiliaries and additives, such as blowing agents, cell regulators, catalysts, dye-producing substances, fillers and fibers.

When the instant mixture is not used alone, other relatively high molecular weight polyols having molecular weights of from 400 to 10,000 preferably of from 450 to 6,000, may be combined with the present polyol mixtures for the formation of polyurethanes. Examples of suitable compounds which are known in polyurethane chemistry and which preferably contain two or more active hydrogen atoms (generally hydroxyl groups) include polyesters; polylactones; polycarbonates; polyethers; polythioethers; polyacetals and vinyl polymers, for example, OH-functional polybutadiene oils. Other examples include polyhydroxyl compounds which already contain urethane or urea groups, optionally-modified natural polyols, or other Zerewitinoff-active groups, such as compounds containing amino, carboxyl or thiol groups. Such compounds are described in, for example, German Offenlegungsschriften Nos. 2,302,564; 2,423,764; 2,549,372 (U.S. Pat. No. 3,963,679); 2,402,799; 2,431,846; 2,402,840 (U.S. Pat. No. 3,984,607); German Auslegeschrift No. 2,457,387 (U.S. Pat. No. 4,035,312), and particularly in Offenlegungsschrift No. 2,854,384.

According to the present invention, preferred compounds include polyesters containing hydroxyl groups (for example, as obtained from glycols and adipic acid, phthalic acid, iso- and/or tere-phthalic acid or hydrogenation products thereof); hydroxy polycarbonates; polycaprolactones and polyethers. Preferred polyethers contain, in particular, from 2 to 8, preferably from 2 to 4, OH groups which are produced by the polymerization of epoxides, such as ethylene oxide, propylene oxide, butylene oxide, tetrahydrofuran, styrene oxide and/or epichlorohydrin, with themselves, for example in the presence of Lewis catalysts, such as $BF_3$. These polyethers may also be produced by the addition of the above epoxides, preferably ethylene oxide and propylene oxide, optionally in admixture or successively, to starting components having reactive hydrogen atoms, such as water; polyols, for example, ethylene glycol, propanediol-(1,3) or -(1,2), trimethylol-propane, glycerin, sorbitol, 4,4'-dihydroxy-diphenyl-propane; amino alcohols, for example, ethanolamine; or amines, for example, aniline or ethylene diamine. Sucrose polyethers and polyethers started on formitol or formose are also included according to the present invention.

Polyhydroxyl compounds may, optionally, also be used which contain high molecular weight polyadducts or polycondensates, or polymers in a finely-dispersed or dissolved form. These polyhydroxyl compounds may be obtained, for example, when polyaddition reactions (for example, reactions between polyisocyanates and amino-functional compounds) or polycondensation reactions (for example, between formaldehyde and phenols and/or amines) are allowed to take place in situ in the above-mentioned compounds containing hydroxyl groups (see, for example, German Offenlegungsschrift Nos. 2,324,134 or 2,639,254). However, it is also possible, according to U.S. Pat. No. 3,869,413 to mix an aqueous polymer dispersion with a polyhydroxyl compound and to then remove the water from the mixture. Polyhydroxy compounds which are modified by vinyl polymers, as they are obtained, for example, by the polymerization of styrene and acrylonitrile in the presence of polyethers (U.S. Pat. Nos. 3,383,351; 3,304,273; 3,523,093; 3,110,695; and German Auslegeschrift No. 1,152,536) or polycarbonate polyols are also suitable for the process according to the present invention.

Examples of suitable compounds according to the present invention are described, for example, in High Polymers, Vol. XVI, "Polyurethanes, Chemistry and Technology", by Saunders-Frisch, Interscience Publishers, New York, London, Volume I, 1962, pages 32–42 and 44–54, and Volume II, 1964, pages 5–6 and 198–199; in Kunststoff-Handbuch, Volume VII, Vieweg-Höchtlen, Carl Hanser Verlag, Munich, 1966, for example on pages 45–71; and in Ullmanns Enzyklopädie der Technischen Chemie, Verlag Chemie-Weinheim, 4th Edition, Volume 19, under the heading "Polyurethane", pages 301–341 and under the heading "Polyalkylenglykole", pages 31–38. Finally, of course, mixtures of the above-mentioned compounds having at least two isocyanate-reactive hydrogen atoms and molecular weights of from 400 to 10,000, for example, mixtures of polyethers and polyesters, may be used.

Compounds containing isocyanate-reactive groups may be used as difunctional chain-lengthening agents or multifunctional compounds (cross-linkers) with molecular weights of from about 18 to 399, such as water, hydrazine, glycols, polyamines, dihydrazide compounds and amino alcohols. Such suitable compounds are listed above as suitable as component (d), are generally used for polyurethane syntheses, and are described in some detail in German Offenlegungsschrift No. 2,854,384.

The polyisocyanates known for the production of polyurethanes which may be used include, for example, aliphatic, cycloaliphatic, araliphatic, aromatic and heterocyclic polyisocyanates, preferably diisocyanates, as described, for example, by W. Siefken in Justus Liebigs Annalen der Chemie, 562, pages 75–136. Examples of these polyisocyanates include hexane-1,6-diisocyanate, 1-isocyanato-3,3,5-trimethyl-5-isocyanatomethyl-cyclohexane, dicyclohexyl-methane-2,4'- and/or 4,4'-diisocyanate, 1,3- and/or 1,4-cyclohexane-diisocyanate, optionally as mixtures of all possible stereoisomers.

Aromatic polyisocyanates, such as toluylene-2,4- and/or -2,6-diisocyanate (TDI), diphenyl-methane-4,4'- and/or -2,4'- and/or -2,2'-diisocyanate (MDI) are particularly suitable, as are the commercially available polyphenyl-polymethylene-polyisocyanates, obtained by aniline/formaldehyde condensation and subsequent phosgenation, described, for example, in British Pat. Nos. 874,430 and 848,671 (MDI containing multinuclear polyisocyanates). The modified polyisocyanates which are obtained by modifying TDI and MDI, for example, polyisocyanates modified with polyols via urethane groups or by carbodiimide, isocyanurate, biuret, allophanate, or uretdione groups are example of suitable modified commercial isocyanates. Such suitable polyisocyanates of a commercial type are described in detail in German Offenlegungsschrift No. 2,854,384, in the Kunststoff-Handbuch, and in Ullmanns Enzyklopädie, 4th Edition, Volume 19, pages 303 and 304. The polyisocyanates may also be used in the form of NCO-prepolymers obtained from the starting polyisocyanates and, for example, relatively high molecular weight polyols.

Other auxiliaries and additives, such as additional relatively high molecular weight polyhydroxyl compounds, polyisocyanates or NCO-prepolymers, blowing agents, solvents and the like, which are not already present, or are not present in a sufficient quantity and composition, may be added in a separate metering operation or in admixture with one of the reaction components. Other examples of these auxiliaries and additives include catalysts or reaction retarders, blowing agents, cell regulators, emulsifiers, polysiloxanes, fillers, dyes, pigments, antioxidants, UV absorbers, light protection agents, stabilizers against nitric oxides, flameproofing agents, hydrolysis protection agents and, optionally, a small quantity of monofunctional chain-terminators.

The polyols according to the present invention may be processed together with the other reactants of the polyurethane formation according to various known methods and processes, for example, in multi-stage processes, as in NCO prepolymer formation with subsequent reaction. Processing is predominantly carried out using suitable metering, mixing and/or discharge devices or in molds, as are conventional in polyurethane processing (see, for example, Ullmanns Enzyklopädie der Technischen Chemie, 4th Edition, Volume 19, under "Polyurethane", pages 314°336).

Using the polyol mixtures according to the instant invention, non-cellular polyurethane elastomers; thermoplastic polyurethane elastomers; polyurethane rubber or cast elastomers, also in cellular form, preferably in a bulk density of from 300 to 1000 kg/m$^3$; foams in a flexible-elastic, semi-flexible or rigid-elastic form, for example, as block foams, molded foams in a broad density of, for example, from 20 to 400 kg/m$^2$ and, depending on the use, having closed and/or open cells, may be produced. The polyol mixtures are particularly suitable for the production of moldings having a compact surface and an inwardly increasingly cellular core, such as in the RIM process for the production of integral skin foams. This RIM use and the production of cellular or non-cellular polyurethane elastomers is particularly preferred.

The polyol mixtures according to the present invention may also be used for the production of substantially linear, soluble polyurethanes, for example, for coating compositions, elasthan threads or lacquers, for the production of dispersions, and generally as OH-reactive components.

EXAMPLES

The following polyols are used in the Examples (percentages are by weight).

Polyol A

Trifunctional polyether triol started on trimethylolpropane, OH number 27, consisting of 78% propylene oxide and 22% ethylene oxide (terminal).

Polyol B

Trifunctional polyether triol started on trimethylolpropane, OH number 35, consisting of 86.5% propylene oxide and 13.5% ethylene oxide (terminal).

Polyol C

Polyether polyol started on a mixture of trimethylolpropane and propylene glycol, having a functionality of 2.91 and an OH number of 56, consisting of 100% propylene oxide (comparison polyol—not according to the present invention).

Polyol D

Polyether polyol started on a mixture of trimethylolpropane and propylene glycol (ratio of 84:16), having a functionality of 2.78 and an OH number of 42, consisting of 100% propylene oxide (comparison polyol—not according to the present invention).

Polyol E

Polyoxypropylene polyethylene polyol started on ethylene diamine, OH number 60 (comparison polyol—not according to the present invention).

Polyol F

Trifunctional polyether triol starting on trimethylolpropane, OH number 28, consisting of 87% propylene oxide and 13% ethylene oxide (terminal).

Polyol G

Trifunctional polyether triol started on trimethylolpropane, OH number 28, consisting of 83% propylene oxide and 17% ethylene oxide (terminal).

Polyol H

Difunctional polypropylene glycol ether of OH number 56 (comparison polyol—not according to the present invention).

Polyol I

Difunctional polyether diol starting on propylene glycol, OH number 56, consisting of 92.5% propylene oxide and 7.5% ethylene oxide (terminal).

Polyol K

Difunctional polyether diol started on propylene glycol, OH number 56, consisting of 80% propylene oxide and 20% ethylene oxide (terminal).

Polyol L

Polyoxypropylene glycol ether of OH number 28 (comparison polyol—not according to the present invention).

Polyol M

Difunctional polyether diol started on propylene glycol, OH number 28, consisting of 85% propylene oxide and 15% ethylene oxide (terminal).

Polyol N

Difunctional polyether diol started on propylene glycol, OH number 28 consisting of 80% propylene oxide and 20% ethylene oxide (terminal).

The following ethylene glycol/propylene oxide adducts are used in the Examples:

Adduct I

Produced from 1 mol of ethylene glycol and 0.25 mols of propylene oxide.

Properties

OH number (mg KOH/g): 1363
pH: 5.85
Viscosity (mPa.s/25° C.): 25.7
Acid number (mg KOH/g): 0.04
Water content (%): 0.01

Adduct I (mol ratio of ethylene glycol (EG) to propylene oxide (PO)=1:0.25) was produced as follows:

7294 g of ethylene glycol (117.6 mols) were introduced at room temperature into an autoclave which was equipped with a heating and cooling device, a stirrer, a means for expelling the air (for example, a vacuum connection and nitrogen supply line), and a device for metering in the alkylene oxide. The atmospheric oxygen was removed by twice evacuating the reaction vessel and purging it with nitrogen. After heating to 80° C., 90 g of 50% aqueous potash lye was added. 1706 g (29.4 mols) of propylene oxide was then gradually metered in under a pressure of from 0.4 to 0.6 bars and at a temperature of from 100° to 105° C., over a period of about 3 hours (mol ratio of EG:PO=1:0.25), with the reaction temperature being maintained by cooling or heating the reaction mixture. After all the propylene oxide had been added, the mixture was stirred for a further 3 hours at from 100° to 105° C. After adding 900 g of water, the alkaline polymer was neutralized with 319.5 g of 12.5% sulphuric acid. The water was distilled off under vacuum at from 90° to 105° C., and the adduct was then filtered off from the deposited salts. The resulting colorless product had a composition by gas chromatographic analysis of:

64.1% of ethylene glycol
32.2% of monopropoxylation product of ethylene glycol
3.7% of dipropoxylation product of ethylene glycol
(0.1% of poly-propoxylated products).

Adducts II, III

The potash lye was removed from an Adduct I mixture by absorption on a synthetic magnesium silicate (Britesorb ® produced by Philadelphia Quartz Company, U.S.A.). The resulting physical properties were:

Adduct II (Mol ratio of ethylene glycol to propylene oxide = 1:0.25.).
OH number (mg KOH/g): 1415
pH: 8.95
Water content (%): 0.02
Viscosity (mPa.s/25° C.): 24.2

A third mixture was neutralized using phosphoric acid. After distilling off the water and filtration of the salts, the following values were obtained:

Adduct III

OH number (mg KOH/g): 1496
pH: 8.65
Water content (%): 0.07
Viscosity (mPa.s/25° C.): 24.9
Acid number (mg KOH/g): 0.05

Adduct IV (according to the present invention)

Adduct I was mixed with 1%, by weight, of potassium acetate, and the salt dissolved completely.

Adduct V (according to the present invention)

Ethylene glycol, which had been distilled and had a water content of 0.05% and a refractive index at 20° C., 1.4314, and propylene oxide, which had a water content of 0.04% and a refractive index at 20° C., from 1.3658 to 1.3664, were used as starting materials.

25 g of potassium hydroxide powder are introduced into a 6 liter autoclave, which is closed and charged with nitrogen for 15 minutes in order to expel the air from the autoclave. 4340 g of ethylene glycol (70 mols) are then introduced into the autoclave through an inlet pipe. The mixture is heated to about 100° C. under nitrogen. 1050 g of propylene oxide (18.1 mols) are then added in about 40 portions of from about 25 to 30 g over a period of 3.5 hours (mol ratio of EG:PO = 1:0.259). The pressure in the autoclave increases by about 2.4 additional atmospheres with each quantity of propylene oxide which is added, and then it decreases to 0.3 atmospheres as the reaction continues.

At the end of the reaction, the mixture is stirred for 30 minutes at 100° C. It is then cooled to room temperature and the autoclave is opened. The mixture is adjusted to a pH of from 8 to 9 using anhydrous acetic acid. The pH is measured electrically after addition of 10% per weight of water. The autoclave contents are drawn by suction into a suction flask and weighed. The product contains 0.8%, by weight, of potassium acetate.

Characteristic data

Water content: 0.2–0.3%
Refractive index at 20° C.: 1.4368–1.4378
pH: 8.5
OH number: 1462
Viscosity (mPa.s/25° C.): 32

Adduct VI 6132 g of ethylene glycol (98.9 mols) were reacted with 2868 g of propylene oxide (49.45 mols) according to the same processes as for Adduct I (mol ratio of EG to PO = 1:0.5). After neutralizing with 12.5% sulphuric acid and working-up, a colorless product was obtained having the following data:
OH number (mg KOH/g): 1200
pH: 5.5
Water content (%): 0.02
Viscosity (mPa.s/25° C.): 29.3
Acid number (mg KOH/g): 0.05

Adduct VII (according to the present invention)

Adduct VI was mixed with 0.8%, by weight, of potassium acetate, resulting in complete dissolution.

Adduct VIII (not according to the present invention)

Produced from 1 mol of ethylene glycol and 1 mol of propylene oxide.

Analytical data

OH number (mg KOH/g): 855
Acid number (mg KOH/g): 0.06
Water content (%): 0.03
Viscosity (mPa.s/25° C.): 46.6
pH: 7.5

Composition determined by gas chromatography

16% by weight, of ethylene glycol
46.4%, by weight, of monopropoxylated ethylene glycol
33.6%, by weight, of dipropoxylated ethylene glycol
3.8%, by weight, of tripropoxylated ethylene glycol
0.2%, by weight, of higher propoxylated ethylene glycol

Adduct IX (not according to the present invention)

Produced from 1 mol of ethylene glycol and 0.25 mols of ethyl oxirane (butylene-1,2-oxide).

Analytical data

OH number (mg of KOH/g):
   1332 (Determination using phthalic acid anhydride)
   1364 (Determination using acetic acid anhydride)
Acid number (mg KOH/g): 0.03
Water content (%): 0.12
Viscosity (mPa.s/25° C.): 27.3
pH: 9.4
Density (25° C.): 1.07

Composition determined by gas chromatography 67.7% of ethylene glycol
29.9% of monobutoxylated ethylene glycol
2.4% of dibutoxylated ethylene glycol

Adduct X (according to the present invention)

Adduct IX was mixed with 0.6%, by weight, of sodium acetate, resulting in complete dissolution.

Adduct XI (not according to the present invention, salt free)

Produced from 1 mol of ethylene glycol and 0.25 mols of 2,2-dimethyl oxirane (isobutylene oxide).

Analytical data

OH number (mg KOH/g):
  1442 (Determination using phthalic acid anhydride)
  1459 (Determination using acetic acid anhydride)
Acid number (mg KOH/g): 0.26
Water content (%): 0.07
Viscosity (mPa.s/25° C.): 25.6
pH: 4.85

Composition determined by gas chromatography 87.3% of ethylene glycol
7.8% of monobutoxylated ethylene glycol
4.8% of dibutoxylated ethylene glycol

Adduct XII (according to the present invention)

Adduct XI was mixed with 0.8%, by weight, of sodium acetate, resulting in complete dissolution.

Adduct XIII (not according to the present invention)

The adduct was produced by propoxylating butane diol-1,4 in the specified mol ratio with KOH catalysis, and by subsequent neutralization with sulphuric acid, vacuum treatment and filtration of the potassium salts (corresponding to Adduct I).

The resulting Adduct XIII has the following

Composition of the butane diol-1,4-propylene oxide adduct (mol ratio 1:0.25) using gas chromatography 68.8%, by weight, of butane diol-1,4
30.1%, by weight, of monopropoxylated butane diol
1%, by weight, of dipropoxylated butane diol.

EXAMPLE 1

Polyol A (100 g) is mixed with various quantities of different ethylene glycol-propylene oxide adducts (each with mol ratios of ethylene glycol to propylene oxide of 1:0.25), with stirring, storage at room temperature and visually tested for single-phase stability or phase separation.

| | |
|---|---|
| 1.1 Polyol A/Adduct I | (not according to the present invention) |
| 1.2 Polyol A/Adduct II | (not according to the present invention) |
| 1.3 Polyol A/Adduct III | (not according to the present invention) |
| 1.4 Polyol A/Adduct IV | (according to the present invention; containing solubilizing salt) |
| 1.5 Polyol A/Adduct V | (according to the present invention; containing solubilizing salt) |

TABLE 1

Phase stability of Polyol A/ethylene glycol-propylene oxide adducts.

| Grams of Adduct Added | Ex. 1.1. | 1.2. | 1.3. | 1.4. | 1.5. |
|---|---|---|---|---|---|
| 5 | + | + | + | +(95)[a] | + |
| 10 | + | + | + | +(157) | + |
| 15 | + | + | + | +(214) | + |
| 20 | + | + | + | +(266) | + |
| 25 | + | + | + | +(314) | + |
| 30 | − | − | − | +(358) | + |
| 40 | − | − | − | +(437) | + |
| 45 | − | − | − | −(472) | − |
| 50 | − | − | − | −(505) | − |
| 100 | − | − | − | −(745) | − |

+means: stable single phase over 6 months;
−means: inhomogeneous;
[a]"mixed OH number" (calculated) (this term means the OH-number of the mixture), in mg KOH/g.

COMPARATIVE EXAMPLES 1.6. AND 1.7. (NOT ACCORDING TO THE PRESENT INVENTION)

Comparative Example 1.6. (see Table 2) shows the compatibility of polyol A/ethylene glycol mixtures and Comparative Example 1.7. (see Table 3) shows the compatibility of Polyol A/ethylene glycol/propane diol-1,2-mixtures.

TABLE 2

Phase stability of Polyol A/ethylene glycol mixtures

| Additions to each 100 g of Polyol A | | |
|---|---|---|
| Ethylene glycol [g] | Mixed OH number | Phases |
| — | 27 | 1 |
| 5 | 112 | 1 |
| 10 | 189 | 2 |
| 15 | 259 | 2 |
| 20 | 324 | 2 |
| 25 | 383 | 2 |
| 30 | 438 | 2 |
| 50 | 620 | 2 |

TABLE 3

Phase stability of Polyol A/ethylene glycol/propane diol-1,2-mixtures

| Additions to each 100 g of Polyol A | | Mixed OH No. | Phases |
|---|---|---|---|
| Ethylene glycol [g] | Propane diol-1,2 [g] | | |
| 6.67 | 6.67 | 198 | 1 |
| 6.67 | 13.33 | 287 | 1 |
| 6.67 | 26.67 | 409 | 1 |
| 6.67 | ≧40 | ≧508 | 2 |
| 13.3 | ≧6.67 | ≧305 | 2 |
| 20 | ≧6.67 | ≧384 | 2 |
| 26.67 | ≧6.67 | ≧455 | 2 |
| 33.33 | ≧6.67 | ≧519 | 2 |
| 40 | ≧6.67 | ≧578 | 2 |

≧means, that with higher quantities of. propane-1,2-diol or with higher "mixed OH-numbers" no further change occurs, i.e., that the mixture remains separated in two phases.

SUMMARY OF RESULTS OF EXAMPLE 1

A mixture of Polyol A and ethylene glycol is only homogeneous up to an ethylene glycol content which corresponds to a mixed OH number of about 150 mg KOH/g. If the ethylene glycol proportion is increased, phase separation occurs (Example 1.6.).

If ethylene glycol is replaced by a salt-free ethylene glycol/propylene oxide adduct containing about 64%, by weight, of ethylene glycol (Comparative Examples 1.1, 1.2 and 1.3, not according to the present invention), then a homogeneous mixture is indeed obtained having a substantially higher mixed OH number. This mixed OH number is still substantially lower, however, than the OH number obtained when the salt-containing Adducts IV and V, according to the present invention, are used (Examples 1.4 and 1.5, where mixed OH numbers of about 450 mg KOH/g, corresponding to about 27%, by weight, of free ethylene glycol per 100 parts of Polyol A, were shown).

If an attempt is made to adjust this effect by mixing different quantities of various ethylene glycol/propane diol-,2- mixtures with Polyol A, then a higher mixed OH number may indeed be achieved, compared with those of mixtures of Polyol A with pure ethylene glycol. However, a much lower mixed OH number is still achieved when compared with mixtures using salt-containing Adducts IV and V, according to the present invention.

Likewise, the proportion of ethylene glycol which may be mixed homogeneously with Polyol A, as well as the proportion of the low molecular weight mixture of ethylene glycol and propane diol-1,2 which may be mixed homogeneously with Polyol A, is smaller compared with the proportion of Adducts IV and V, according to the present invention, which may be so mixed.

Moreover, this Example shows that for the production of the polyol mixtures according to the present invention, it does not matter whether the solubility-increasing salt component (c) is subsequently added to the propylene oxide adduct mixture (Example 1.4), or whether it is produced in situ during the production of the ethylene glycol/propylene oxide adduct (Example 1.5).

EXAMPLE 2 (NOT ACCORDING TO THE PRESENT INVENTION)

2.1 Addition of Adduct VIII 100 g of Polyol A and various quantities of Adduct VIII are mixed together at room temperature.

TABLE 4

Phase stabilities of Polyol A/Adduct VIII mixtures (not according to the present invention)

| Adduct VIII [g] to 100 g of Polyol A | Mixed OH Number | Ethylene glycol in %, by weight | Phases |
| --- | --- | --- | --- |
| 5 | 66 | 0.76 | 1 |
| 10 | 102 | 1.45 | 1 |
| 15 | 135 | 2.09 | 1 |
| 20 | 165 | 2.67 | 1 |
| 25 | 193 | 3.20 | 1 |
| 30 | 218 | 3.69 | 1 |
| 40 | 264 | 4.57 | 1 |
| 50 | 303 | 5.33 | 1 |
| 100 | 441 | 8.00 | 1 |
| 200 | 579 | 10.67 | 1 |

2.2 Addition of Adduct VIII plus ethylene glycol 100 g of Polyol A and different quantities of Adduct VIII are mixed together at room temperature and re-diluted with different quantities of ethylene glycol.

TABLE 5

Phase stabilities of Polyol A/ethylene glycol/Adduct VIII mixtures (not according to the present invention).

| Ethylene glycol [g] to 100 g of Polyol A | Adduct VIII [g] | Mixed OH No. | Total Ethylene glycol in %, by Wt. | Phases |
| --- | --- | --- | --- | --- |
| 6.67 | 60 | 272 | 9.76 | 1 |
| 13.33 | 53.33 | 297 | 13.12 | 1 |
| 20 | 46.67 | 321 | 18.48 | 2 |
| 26.67 | 40 | 346 | 19.84 | 2 |
| 33.33 | 33.33 | 371 | 23.2 | 2 |
| 40 | 26.67 | 396 | 26.56 | 2 |
| 46.67 | 20 | 421 | 29.92 | 2 |
| 53.33 | 13.33 | 446 | 33.28 | 2 |
| 60 | 6.67 | 470 | 36.64 | 2 |
| — | 40 | 278 | 4.57 | 1 |
| 6.67 | 33.33 | 325 | 8.57 | 1 |
| 13.33 | 26.67 | 327 | 12.57 | 2 |
| 20 | 20 | 419 | 16.57 | 2 |
| 26.67 | 13.33 | 466 | 20.57 | 2 |
| 33.33 | 6.67 | 514 | 24.57 | 2 |

SUMMARY OF RESULTS OF EXAMPLE 2

This example shows that by the propoxylation of ethylene glycol with propylene oxide which was carried out in a ratio of 1 mol of ethylene glycol to 1 mol of propylene oxide (Adduct VIII) (2.1), and (see Table 4) by the re-dilution of Adduct VIII with ethylene glycol and the use of this product mixture (2.2), the same good results (see Table 5) are not obtained as when the propoxylation product of Example 1 (Adduct IV or V) is used.

This test also shows that substantially high mixed OH numbers of stable single-phase mixtures may indeed be achieved using salt-free Adduct VIII, but that the desired large quantity of ethylene glycol cannot be attained. Thus, even when 100 parts of Adduct VIII per 100 parts of Polyol A are used (Table 4), the proportionate quantity of ethylene glycol is substantially lower, at about 16 g (8%, by weight) compared to the admixture of 40 parts of Adduct IV or Adduct V per 100 parts of Polyol A.

EXAMPLE 3

This Example clarifies the efficiency of Adducts IV and V for the production of stable, single-phase polyol mixtures with different polyols.

3.1 (Comparative Experiment—not according to the present invention)

Different polyether triols are mixed with ethylene glycol and are tested for the stability of the single-phase mixture (Table 6).

3.2 (According to the present invention)

Different polyether triols are mixed with Adduct IV and tested for the stability of the single-phase mixture (Table 7).

3.3 (According to the present invention)

Different polyether triols are mixed with Adduct V and tested for the stability of the single-phase mixture. The same results are obtained as when Adduct IV is used (Example 3.2).

TABLE 6

Phase stabilities of different polyether triol/ethylene glycol mixtures (not according to the present invention).

| 100 g of various polyether triols | Ethylene glycol | Mixed OH No. | Phases |
| --- | --- | --- | --- |
| Polyol B | 5 g | 119 | 1 |
| Polyol B | ≧10 g | ≧196 | 2 |
| Polyol C | ≧5 g | ≧139 | 2 |
| Polyol D | 5 g | 126 | 1 |
| Polyol D | ≧10 g | ≧202 | 2 |

TABLE 6-continued

Phase stabilities of different polyether triol/ethylene glycol mixtures (not according to the present invention).

| 100 g of various polyether triols | Ethylene glycol | Mixed OH No. | Phases |
| --- | --- | --- | --- |
| Polyol E | ≧5 g | ≧143 | 2 |

TABLE 7

Phase stabilities of different polyether triol/Adduct IV mixtures.

| 100 g Polyether triol | Adduct IV | Mixed OH No. | Phases |
| --- | --- | --- | --- |
| Polyol B | 5 g | 103 | 1 |
| Polyol B | ≧10 g | ≧165 | 2 |
| Polyol C | 5 g | 123 | 1 |
| Polyol C | ≧10 g | ≧184 | 2 |
| Polyol D | 5 g | 110 | 1 |
| Polyol D | ≧10 g | ≧171 | 2 |
| Polyol E | 5 g | 127 | 1 |
| Polyol E | ≧10 g | ≧187 | 2 |

SUMMARY OF EXAMPLE 3

Example 3 shows that among the Polyols A-E, Polyol A is preferred with respect to its miscibility with Adducts IV or V (the higher the oxyethylene group content in the polyoxalkylene polyol, the more favorable the solubility).

EXAMPLE 4

Example 4 tests the miscibilities of Polyols A, K and L with Adducts IV, V and (for comparison) VIII. The Polyols A, K and L substantially differ only in the different sized, terminal oxyethylene blocks thereof.

The miscibilities of Polyols A, K and L with the Adducts IV, V and VIII are given in Table 8.

Example 4.1 Mixtures of 100 parts of Polyol A, K and L with 30 parts Adduct IV.

Example 4.2 Mixtures of 100 parts of Polyol A, K and L with 30 parts of Adduct V.

Example 4.3 Mixtures of 100 parts of Polyol A, K and L with 30 parts of Adduct VIII.

TABLE 8

Phase stabilities of the mixtures of Polyol A, K and L with Adducts IV, V and VIII.

|  | 4.1 Adduct IV | 4.2 Adduct V | 4.3 Adduct VIII |
| --- | --- | --- | --- |
| Polyol A | +(358) | +(358) | +(219) |
| Polyol K | −(359) | −(359) | +(220) |
| Polyol L | −(359) | −(359) | +(220) |

SUMMARY OF RESULTS OF EXAMPLE 4

Example 4 shows that only Polyol A with the Adducts IV and V produced single-phase, storage-stable mixtures, even in the specified high weight ratios, while Polyols K and L no longer achieve this. With an almost identical molecular weight and OH number, this may only be due to the size type of the terminal oxyethylene block. Thus, Example 4 shows that high mixed OH numbers with a high ethylene glycol proportion may only be achieved in the combination of polyols of type A, i.e., with higher oxyethylene proportions, with the Adducts IV and V.

On the other hand, Adduct VIII is indeed miscible with all three polyols in the specified weight ratios, but it produces substantially lower mixed OH numbers.

EXAMPLE 5

Example 5 investigates to what extent the findings obtained in Examples 1 to 4 for trifunctional polyether triols are valid for linear polyethers.

Adducts IV and V which behaved in an identical manner, and Adduct VIII, which was used as a comparison, were mixed with Polyols H-Q and tested for the stability of the single-phase mixture.

TABLE 9

Stability of mixtures of the Polyols H-N with the Adducts IV, V or VIII

| 100 g Polyol | Adduct [g] | Mixed OH No | Total Ethylene Glycol in %, by Wt. | Phases |
| --- | --- | --- | --- | --- |
| Polyol H | 5 Adduct IV or V | 123 | 3.05 | 1 |
| Polyol H | 10 Adduct IV or V | 184 | 5.82 | 2 |
| Polyol H | 20 Adduct IV or V | 290 | 10.67 | 2 |
| Polyol H | 30 Adduct IV or V | 380 | 14.76 | 2 |
| Polyol I | 5 Adduct IV or V | 123 | 3.05 | 1 |
| Polyol I | 10 Adduct IV or V | 184 | 5.82 | 1 |
| Polyol I | 20 Adduct IV or V | 290 | 10.67 | 2 |
| Polyol I | 30 Adduct IV or V | 380 | 14.76 | 2 |
| Polyol K | 5 Adduct IV or V | 123 | 3.05 | 1 |
| Polyol K | 10 Adduct IV or V | 184 | 5.82 | 1 |
| Polyol K | 20 Adduct IV or V | 290 | 10.67 | 1 |
| Polyol K | 30 Adduct IV or V | 380 | 14.76 | 1 |
| Polyol K | 40 Adduct IV or V | 457 | 18.28 | 1 |
| Polyol K | 45 Adduct IV or V | 492 | 19.86 | 2 |
| Polyol K | 50 Adduct IV or V | 525 | 21.33 | 2 |
| Polyol L | 5 Adduct IV or V | 96 | 3.05 | 2 |
| Polyol L | 10 Adduct IV or V | 158 | 5.82 | 2 |
| Polyol L | 20 Adduct IV or V | 267 | 10.67 | 2 |
| Polyol L | 30 Adduct IV or V | 359 | 14.76 | 2 |
| Polyol M | 5 Adduct IV or V | 96 | 3.05 | 1 |
| Polyol M | 10 Adduct IV or V | 158 | 5.82 | 2 |
| Polyol M | 20 Adduct IV or V | 267 | 10.67 | 2 |
| Polyol M | 30 Adduct IV or V | 359 | 14.76 | 2 |
| Polyol N | 5 Adduct IV or V | 96 | 3.05 | 1 |
| Polyol N | 10 Adduct IV or V | 158 | 5.82 | 1 |
| Polyol N | 20 Adduct IV or V | 267 | 10.67 | 1 |
| Polyol N | 30 Adduct IV or V | 359 | 14.76 | 2 |
| Comparisons (not according to the present invention) | | | | |
| Polyol H | 5-30 Adduct VIII | 268[2] | 3.69 | 1 |
| Polyol I | 5-30 Adduct VIII | 268[2] | 3.69 | 1 |
| Polyol K | 5-30 Adduct VIII | 268[2] | 3.69 | 1 |
| Polyol L | 5-30 Adduct VIII | 244[2] | 3.69 | 1 |
| Polyol M | 5-30 Adduct VIII | 244[2] | 3.69 | 1 |
| Polyol N | 5-30 Adduct VIII | 244[2] | 3.69 | 1 |

[2]OH numbers with 30 parts of adduct VIII. Mixtures with 5, 10, 15, 20, 25 or 30 parts of adduct VIII give one stable phase.

SUMMARY OF EXAMPLE 5

Here again it is found that it is only possible to achieve as high a mixed OH number as possible when such polyols are used which have a terminal ethylene oxide block which is as large as possible.

In this case as well, Adduct VIII is substantially more compatible, but in this case, not as high mixed OH numbers may be achieved as when either Adduct IV or Adduct V is used.

EXAMPLE 6

Example 6 compares the efficiency of Adducts VI and VII, with respect to the efficiency thereof during the homogenization of the polyether Polyols A-N, being compared with Adduct IV.

Example 6.1 Compatibility of 100 parts of polyether Polyols A-N with 25 parts of salt-free Adduct VI (EG:PO ratio of 1:0.5) (not according to the present invention).

Example 6.2 Compatibility of 100 parts of polyether Polyols A-N with 25 parts of Adduct VII (salt-containing, with an EG:PO ratio of 1:0.5) (according to the present invention).

Example 6.3 Compatibility of 100 parts of polyether Polyols A-N with 25 parts of salt-containing Adduct IV (EG:PO ratio of 1:0.25) (according to the present invention).

TABLE 10

Phase stabilities of mixtures, of the Polyols A-N with Adducts VI, VII and IV (+ = single phase, − = two phases)

| Polyetherpolyol | Adduct VI | Adduct VII | Adduct IV |
|---|---|---|---|
| Polyol A | + | + | + |
| Polyol B | − | − | − |
| Polyol C[2] | − | − | − |
| Polyol D[2] | − | − | − |
| Polyol E[2] | − | − | − |
| Polyol F | − | − | − |
| Polyol G | − | + | − |
| Polyol H[2] | − | − | − |
| Polyol I | − | − | − |
| Polyol K | + | + | + |
| Polyol L | − | − | − |
| Polyol M | − | − | − |
| Polyol N | + | + | + |

[2] Polyols not according to the present invention.

Example 7 shows that the use of Adduct VII instead of Adduct IV, within the concentration range examined, does not provide any particular advantages.

EXAMPLE 7

Example 7 compares the efficiency of Adducts IX, X, XI and XII with respect to the formation of single-phase, homogeneous mixtures with polyether Polyols A, F and G.

7.1 Compatibility of 100 parts of Polyols A, F and G with from 5 to 50 parts of Adduct IX (adduct not according to the present invention).

7.2 Compatibility of 100 parts of Polyols A, F and G with from 5 to 50 parts of Adduct X (adduct according to the present invention).

7.3 Compatibility of 100 parts of Polyols A, F and G with from 5 to 50 parts of Adduct XI (adduct not according to the present invention).

7.4 Compatibility of 100 parts of Polyols A, F and G with from 5 to 50 parts of Adduct XII (adduct according to the present invention).

TABLE 11

Phase stabilities of mixtures of the Polyols A, F and G with the Adducts IX, X, XI and XII.

| Adduct | Polyol (per 100 g) | | |
|---|---|---|---|
| | Polyol A | Polyol F | Polyol G |
| 5 parts of Adduct IX | + | + | + |
| 10 parts of Adduct IX | + | + | + |
| 20 parts of Adduct IX | + | − | + |
| 30 parts of Adduct IX | + | − | − |
| 50 parts of Adduct IX | − | − | − |
| 5 parts of Adduct X | + | + | + |
| 10 parts of Adduct X | + | + | + |
| 20 parts of Adduct X | + | − | + |
| 30 parts of Adduct X | + | − | + |
| 50 parts of Adduct X | + | − | + |
| 5 parts of Adduct XI | + | + | + |
| 10 parts of Adduct XI | + | − | + |
| 20 parts of Adduct XI | − | − | − |
| 30 parts of Adduct XI | − | − | − |
| 50 parts of Adduct XI | − | − | − |
| 5 parts of Adduct XII | + | + | + |
| 10 parts of Adduct XII | + | + | + |
| 20 parts of Adduct XII | + | − | − |
| 30 parts of Adduct XII | + | − | − |
| 50 parts of Adduct XII | + | − | − |

+: single phase
−: two phases

EXAMPLE 8

Example 8 clarifies the efficiency of different salts effecting the homogenization of Adduct I with Polyol A.

25 or 35 parts of an at the most 1% solution of the salts listed in Table 12 in Adduct I were mixed with 75 or 65 parts of Polyol A and tested for the stability of the single phase mixture.

TABLE 12

Phase stabilities of Adduct I-salt/Polyol A mixtures

| Salt | 25 parts | 35 parts |
|---|---|---|
| Li—pivalate | + | − |
| NaCl | + | − |
| NaHCO$_3$ | + | − |
| Na$_2$SO$_4$ | + | − |
| NaI | + | − |
| Na—formate | + | − |
| Na—acetate | + | − |
| KHCO$_3$ | + | + |
| KSCN | + | + |
| KBr | + | + |
| K—octoate | + | − |
| NH$_4$—acetate | + | − |
| Mg—acetate | + | − |
| Ca—acetate | + | − |
| Ca—octoate | + | − |
| BaCl$_2$ | + | − |
| Ba—acetate | + | − |
| Ba—octoate | + | − |
| Al—acetate | + | − |

EXAMPLE 9

Phase stability of Polyol A/butane diol adducts and comparative experiments

In each case, 100 g of polyol A are mixed with different quantities of various diols, including butane diol-1,4; Adduct XIII (salt-free, not according to the present invention); and Adduct XIII, plus 1% of K-acetate (according to the present invention), and tested for phase stability.

TABLE 13

Phase stability of Polyol A/Diol mixtures (each based on 100 parts of Polyol A)

| Quantity of Adduct (Parts) | Butane diol-1,4 | Adduct XIII | Adduct XIII, plus 1% of K—acetate |
|---|---|---|---|
| 5 | + | + | + |
| 10 | + | + | + |
| 15 | − | + | + |
| 20 | − | − | + |
| 25 | − | − | − |
| 30 | | | + |
| 50 | | | + |
| 70 | | | + |
| 100 | | | + |
| 150 | | | + |
| 200 | | | + |

TABLE 13-continued

Phase stability of Polyol A/Diol mixtures (each based on 100 parts of Polyol A)

| Quantity of Adduct (Parts) | Butane diol-1,4 | Adduct XIII | Adduct XIII, plus 1% of K—acetate |
|---|---|---|---|
| 500 | | | + |

+: single-phase, storage-stable
−: two phases

EXAMPLE 10

Tough-elastic, rigid polyurethane integral skin foam 10.1 (according to the present invention)

Formulation

Storage-stable polyol component:
75 parts of Polyol A
25 parts of Adduct V
2 parts of L 5420 ® (cell stabilizer produced by Union Carbide Corporation)
0.3 parts of water
1 part of Dabco 33 LV ® (t-amine catalyst produced by Air Products).

100 parts of this polyol formulation (calculated OH number: 392) are mixed with 15 parts of trichloromethane and 110 parts of Isocyanate A and are foamed on an HK 165 machine produced by Maschinenfabriken Hennecke (St. Augustin) (isocyanate index 105).

Isocyanate A consists of a mixture of 161 parts of a polyisocyanate which is obtained by phosgenating aniline/formaldehyde condensates and by a subsequent reaction with a mixture of tri- and tetra-propylene glycol of OH number 480, and has a viscosity of 130 mPa.s at 25° C. and an NCO content of 28%, by weight.

Machine data

Raw material temperature (°C.): 25
Tool temperature (°C.): 60
Starting/setting/rising time (sec): 10/22/35
Bulk density free-foamed (kg/m$^3$): 70

The flow behavior in bulk density 600 is satisfactory (likewise in bulk densities 300 and 150). Test packets and test plates are free from defects.

Mechanical data (1 cm thick test plates)

Bulk density (kg/m$^3$): 600
Flexural strength (MPa): 22.4
Flexural-E-Modulus (Mpa): 530
Tensile strength (MPa): 11.5
Elongation at tear (%): 34.5
Impact strength (kJ/m$^3$): 55

10.2 Comparative Experiment

Formulation

Polyol component (not stable in storage):
80 parts of Polyol A
20 parts of ethylene glycol
2 parts of L 5420 ®-cell stabilizer (UCC)
0.3 part of water
1 part of Dabco 33 LV ®

The processing formulation and isocyanate component were identical to those described in 10.1.

Machine data

Raw material temperature (°C.): 25
Tool temperature (°C.): 60
Starting/setting/rising time (sec): 15/30/39
Bulk density free-foamed (kg/m$^3$): 70

The flow behavior in bulk density 600 kg/m$^3$ is satisfactory (likewise in bulk density 300). Test packets and test plates are free from defects.

Mechanical data (1 cm thick test plates)

Bulk density (kg/m$^3$): 600
Flexural strength (MPa): 2.7
Flexural-E-Modulus (MPa): 300
Tensile strength (MPa): 9.2
Elongation at tear (%): 54.2
Impact strength (kJ/m$^3$): Material unbroken

EXAMPLE 11

Semi-rigid polyurethane integral skin foam 11.1 (according to the present invention).

Formulation (phase-stable at 20° C. and at 50° C.)

94 parts of Polyol B
6 parts of Adduct V
0.2 parts of water
1 part of Dabco 33 LV ®.

101 parts of this polyol formulation are mixed with 15 parts of trichlorofluoromethane and 36 parts of Isocyanate A and foamed on an HK 165 machine produced by Maschinenfabriken Hennecke (St. Augustin) (isocyanate index 105).

11.2 (not according to the present invention)

Formulation (not stable in storage)

94 parts of Polyol B
4.85 parts of ethylene glycol
0.2 parts of water
1 part of Dabco LV 100 parts of this polyol formulation are mixed with 15 parts of trichlorofluoromethane and 36 parts of Isocyanate A, and foamed on an HK 165 machine produced by Maschinenfabriken Hennecke (St. Augustin) (isocyanate index 105).

| Mechanical data (1 cm thick plates) | | |
|---|---|---|
| | 11.1 | 11.2 |
| Bulk density | 319 | 314 |
| Compression test 40% compression (kPa) | 113 | 110 |
| Pressure deformation residue 50% (%) | 6 | 5 |
| Tension test Tear tension (kPa) | 390 | 360 |
| Elongation at tear (%) | 88 | 70 |
| Tear propagation resistance (kN/m) | 1.19 | 1.13 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A single-phase, storage-stable, emulsifier-free polyol mixture comprising 100 parts of a relatively high molecular weight polyoxyalkylene polyol of OH number from 20 to 120, which has at least 5% and less than 80%, by weight, of terminal oxyethylene blocks; from 1 to 100 parts of a low molecular weight diol mixture which is a reaction product of ethylene glycol, butane diol-1,4, or a mixture of ethylene glycol and butane diol-1,4 with from 0.05 to 0.50 mols/mol of ethylene glycol, butane diol-1,4 of a mixture of these compounds of alkyl oxiranes corresponding to the formula:

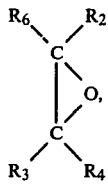

wherein $R_1$ represents $CH_3$, $CH_2Cl$ or $C_2H_5$;

$R_2$ represents H or $CH_3$; and $R_3$ and $R_4$ represent H, $CH_3$ or $C_2H_5$;

and from 0.01 to 5 parts of solubilizing additives comprising one or more salts, the cations of which are from Groups I, II and III of the Periodic Table, ammonium or mono- to tetra-alkyl ammonium ions, and the anions of which are produced by removing at least one proton from an acid having a $pK_s$ value of at least $10^{-7}$.

2. A polyol mixture according to claim 1, characterized in that 0 to 20 parts of another component containing isocyanate-reactive hydrogen atoms comprising di- or higher-functional compounds having molecular weights of from 32 to 399, are used for producing the polyol mixture.

3. A polyol mixture according to claims 1 or 2, characterized in that auxiliaries and additives known for the production of polyurethanes are used for producing the polyol mixture.

4. A polyol mixture according to claim 1, characterized in that the polyoxyalkylene polyols contain from 10 to 50%, by weight, of terminal ethylene oxide blocks.

5. A polyol mixture according to claim 1, characterized in that the polyoxypropylene polyols contain from 12.5 to 27.5%, by weight, of terminal ethylene oxide blocks.

6. A polyol mixture according to claim 1, characterized in that the polyoxypropylene polyols are di- to tetra-hydric functional and have OH numbers of from 20 to 60.

7. Polyol mixtures according to claim 1, characterized in that the low molecular weight diol mixture comprises:

(i) at least 40%, by weight, of ethylene glycol, butane diol-1,4 or a mixture of ethylene glycol and butane diol-1,4;

(ii) from 20 to 50%, by weight, of monoalkoxylation products of ethylene glycol, butane diol-1,4 or a mixture of ethylene glycol and butane diol-1,4;

(iii) from 0 to 20%, by weight, of dialkoxylation products of ethylene glycol, butane diol-1,4 or a mixture of ethylene glycol and butane diol-1,4;

(iv) from 0 to 10%, by weight, of trialkoxylation products of ethylene glycol, butane diol-1,4 or a mixture of ethylene glycol and butane diol-1,4;

(v) from 0 to 2%, by weight, of higher alkoxylated products of ethylene glycol, butane diol-1,4 or a mixture of ethylene glycol and butane diol-1,4.

8. A polyol mixture according to claim 1, characterized in that the low molecular weight diol mixture is a reaction product of 1 mol of ethylene glycol, butane diol-1,4 or a mixture of ethylene glycol and butane diol-1,4 and from 0.05 to 0.5 mols of propylene oxide.

9. A polyol mixture according to claim 1, characterized in that the low molecular weight diol mixture is a reaction product of 1 mol of ethylene glycol and from 0.2 to 0.4 mols of propylene oxide.

10. A polyol mixture according to claim 2, characterized in that from 0.01 to 5 parts of a member selected from the group consisting of alkali metal salts, alkaline earth metal salts, tetra-alkyl ammonium salts of $C_1-C_8$ carboxylic acids, hydrohalic acid, hydropseudohalic acids, sulphuric acid, nitric acid, phosphoric acid or a mixture of the above, are used as the solubilizing additives.

11. A polyol mixture according to claim 2, characterized in that sodium salts and from 0.1 to 2.5 parts/part of sodium salts used of a mixture of the potassium salts of $C_1-C_8$ carboxylic acids, hydrohalic acids and hydropseudohalic acids are used as the solubilizing additives.

12. A process for the production of polyurethanes comprising reacting isocyanates with a single-phase; storage-stable, emulsifier-free polyol mixture comprising 100 parts of a relatively high molecular weight polyoxyalkylene polyol of OH number from 20 to 120, which has at least 5% and less than 80%, by weight, of terminal oxyethylene blocks; from 1 to 100 parts of a low molecular weight diol mixture which is a reaction product of ethylene glycol, butane diol-1,4 or a mixture of ethylene glycol and butane diol-1,4, with from 0.05 to 0.50 mols/mol of ethylene glycol, butane diol-1,4 or a mixture of these compounds of alkyl oxiranes corresponding to the formula:

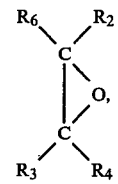

wherein $R_1$ represents $CH_3$, $CH_2Cl$ or $C_2H_5$;

$R_2$ represents H or $CH_3$; and $R_3$ and $R_4$ represent H, $CH_3$ or $C_2H_5$;

and from 0.01 to 5 parts of solubilizing additives comprising one or more salts, the cations of which are from Groups I, II and III of the Periodic Table, ammonia or mono- to tetra-alkyl ammonium ions, and the anions of which are produced by removing at least one proton from an acid having a $K_s$ value of at least $10^{-7}$.

13. A process according to claim 12, characterized in that the polyol mixture also comprises 0 to 20 parts of other di- or higher-functional compounds having isocyanate-reactive hydrogen atoms and molecular weights of from 32 to 399.

14. A process according to claims 12 or 13, characterized in that isocyanates are reacted with the polyol mixture and other polyols having molecular weights of from 400 to 10,000.

15. A process according to claim 14, characterized in that other auxiliaries and additives known in the production of polyurethanes are contained in the polyol mixture are added separately to the reaction mixture, or are contained in the polyol mixture and are added separately to the rection mixture.

* * * * *